Jan. 3, 1956　　　　　A. J. EVERS　　　　　2,729,151
TRANSFER MECHANISM FOR BAGMAKING MACHINES
Filed July 31, 1952　　　　　　　　　　　12 Sheets-Sheet 1

INVENTOR.
Arthur J. Evers.
BY
Thomas E. Tate
Agent

Jan. 3, 1956   A. J. EVERS   2,729,151
TRANSFER MECHANISM FOR BAGMAKING MACHINES
Filed July 31, 1952   12 Sheets-Sheet 2

INVENTOR.
Arthur J. Evers.
BY
Thomas E. Tate
Agent.

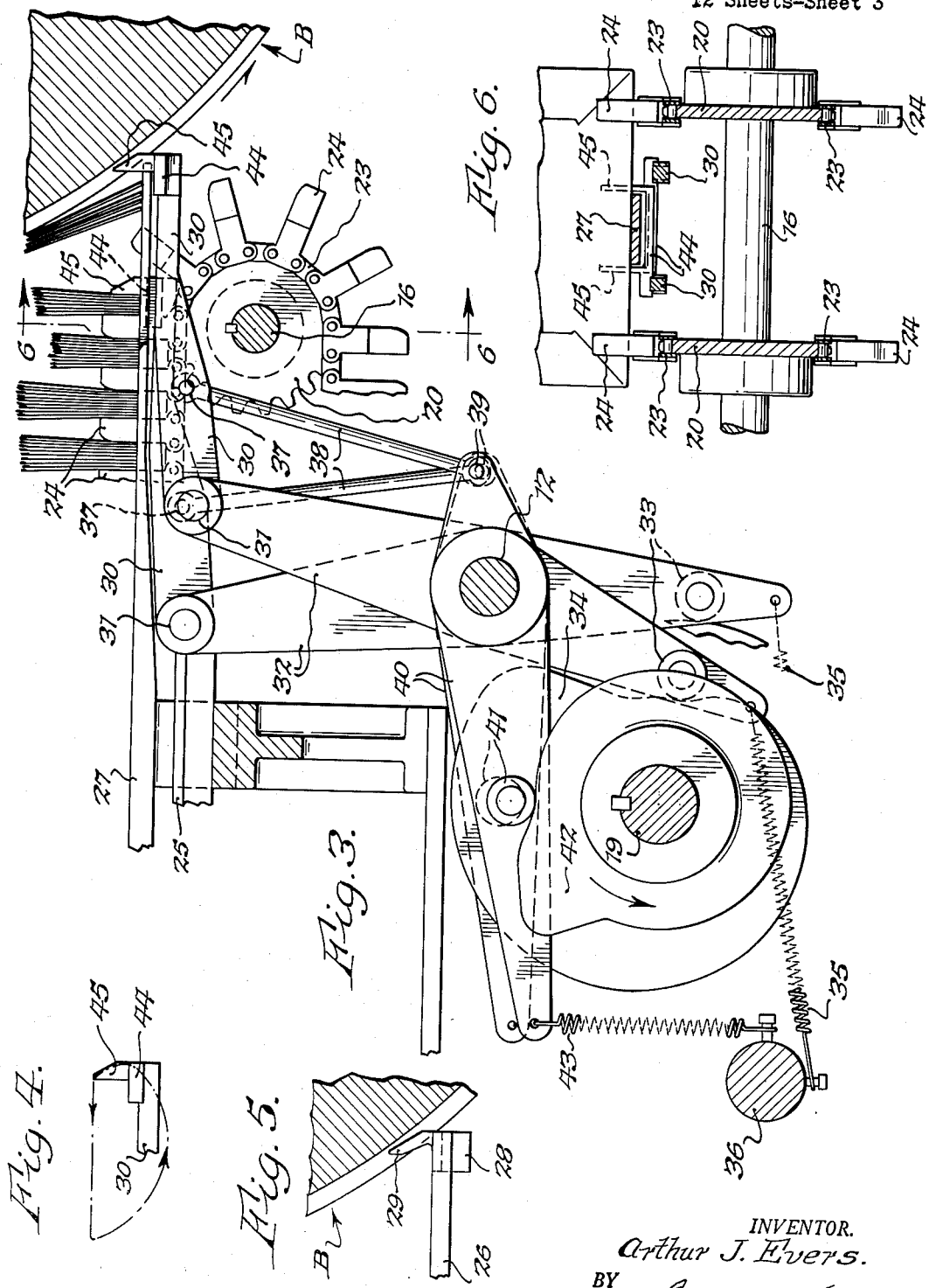

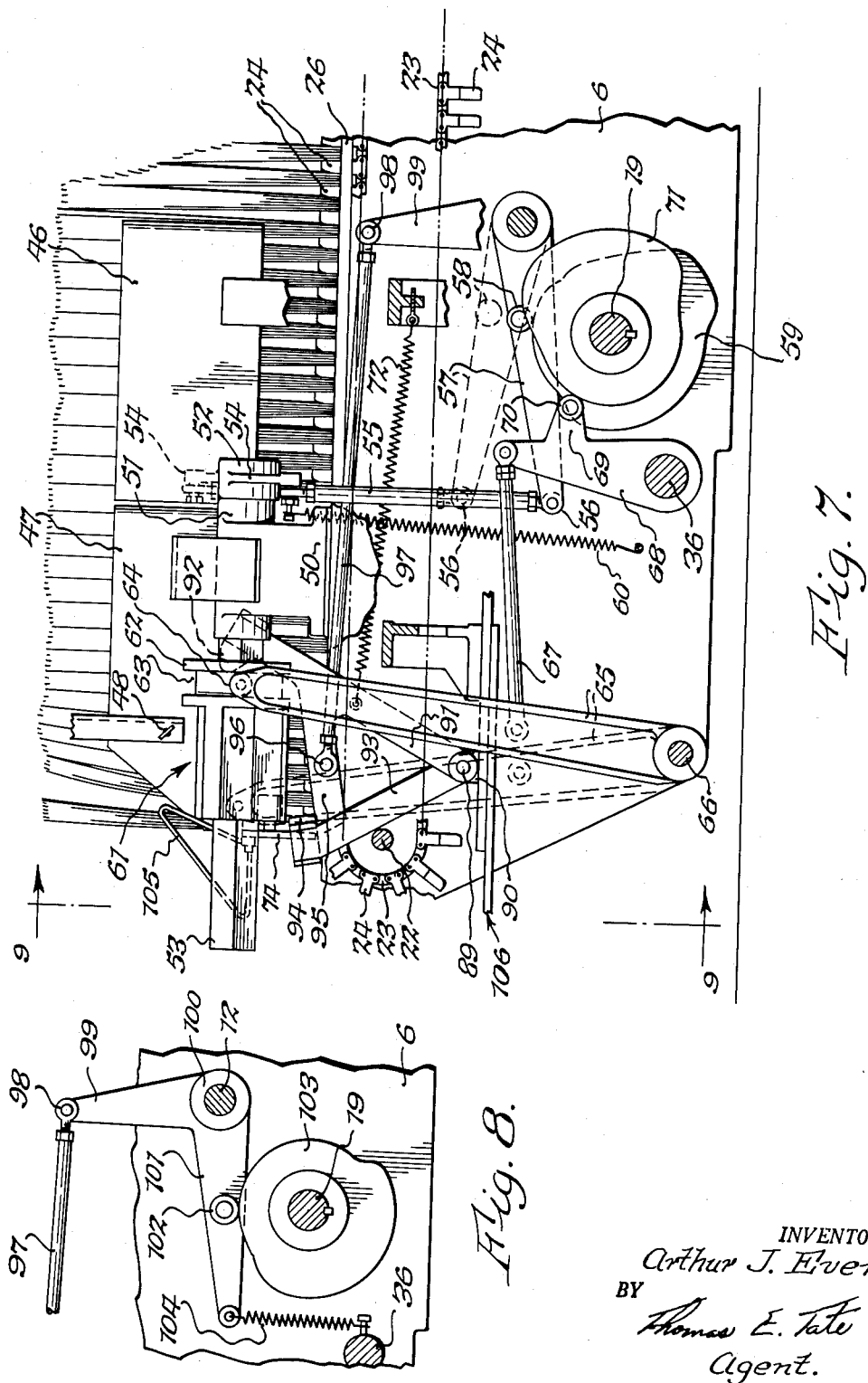

Jan. 3, 1956

A. J. EVERS 2,729,151

TRANSFER MECHANISM FOR BAGMAKING MACHINES

Filed July 31, 1952

INVENTOR.
Arthur J. Evers.
BY
Thomas E. Tate
Agent.

Jan. 3, 1956
A. J. EVERS
2,729,151
TRANSFER MECHANISM FOR BAGMAKING MACHINES
Filed July 31, 1952
12 Sheets-Sheet 6
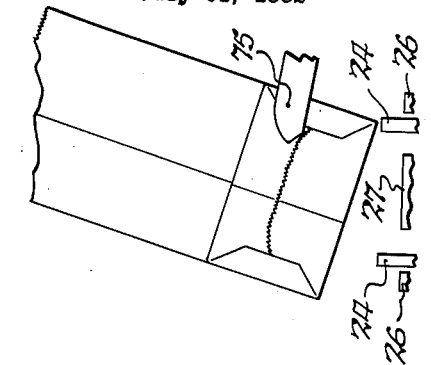
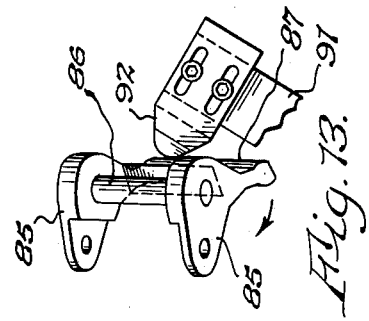
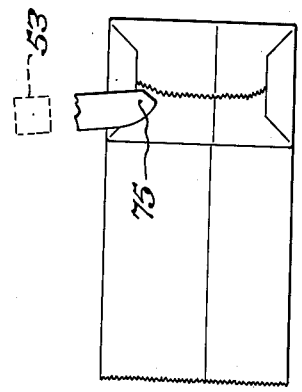
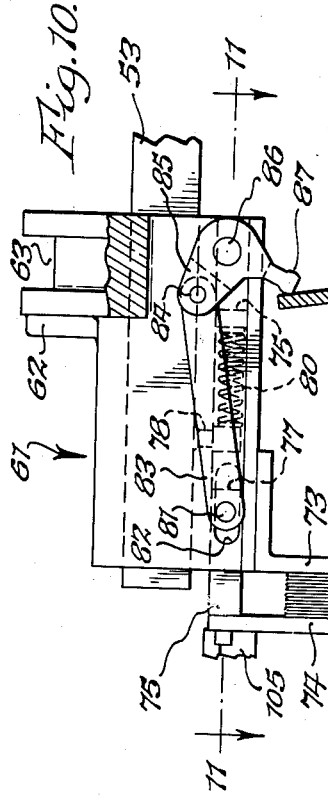
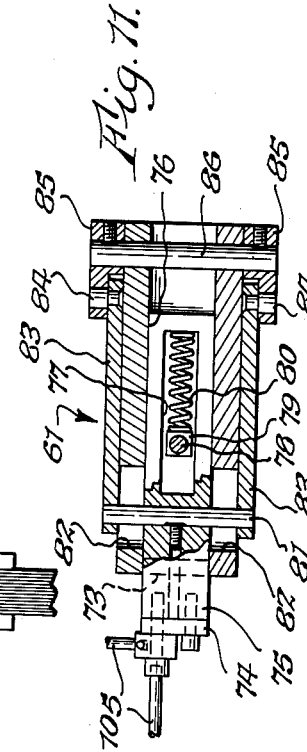
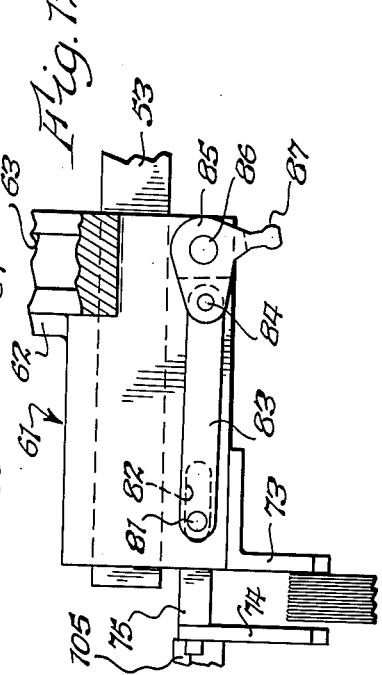
INVENTOR.
Arthur J. Evers.
BY
Thomas L. Tate
Agent.

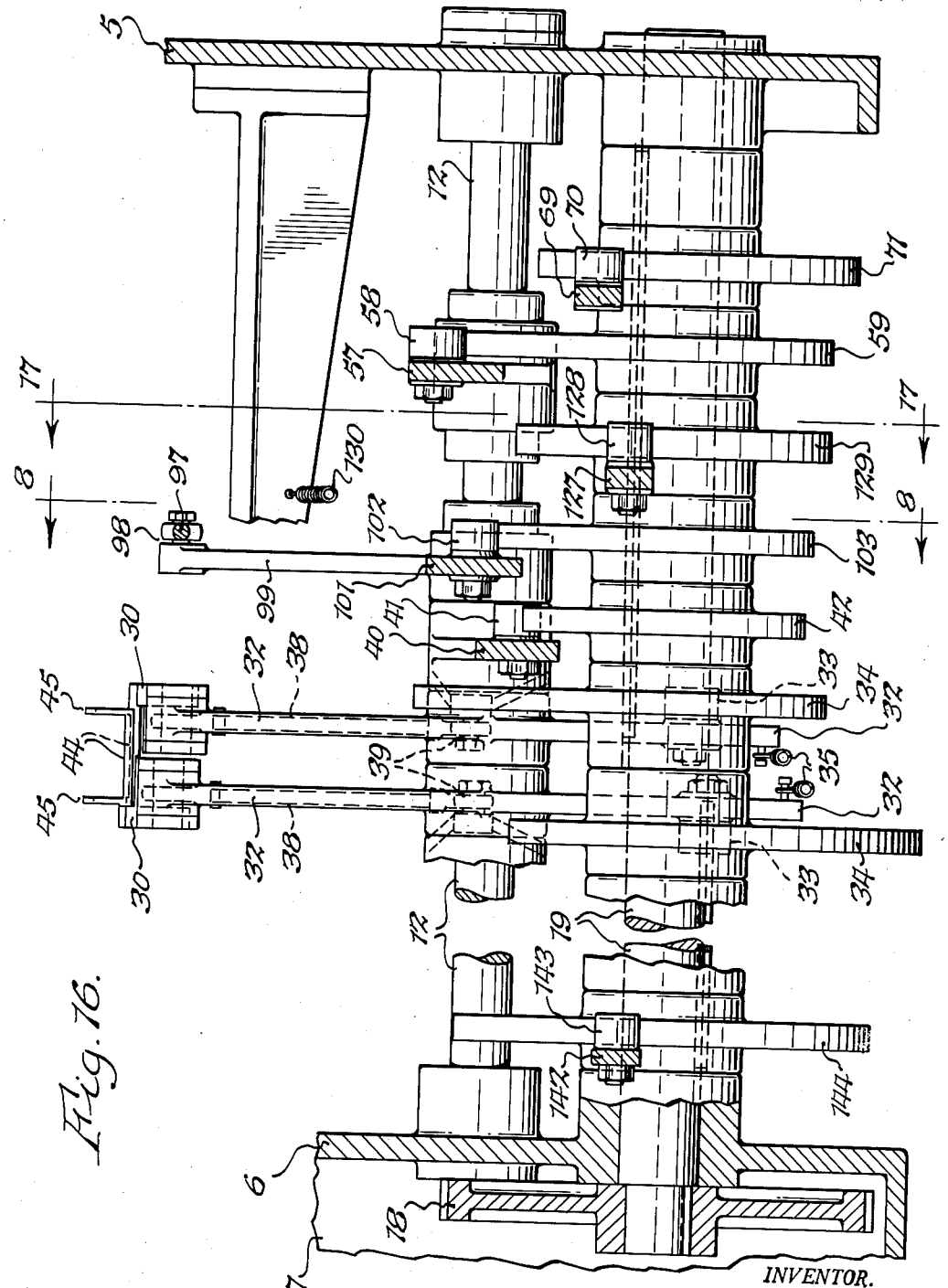

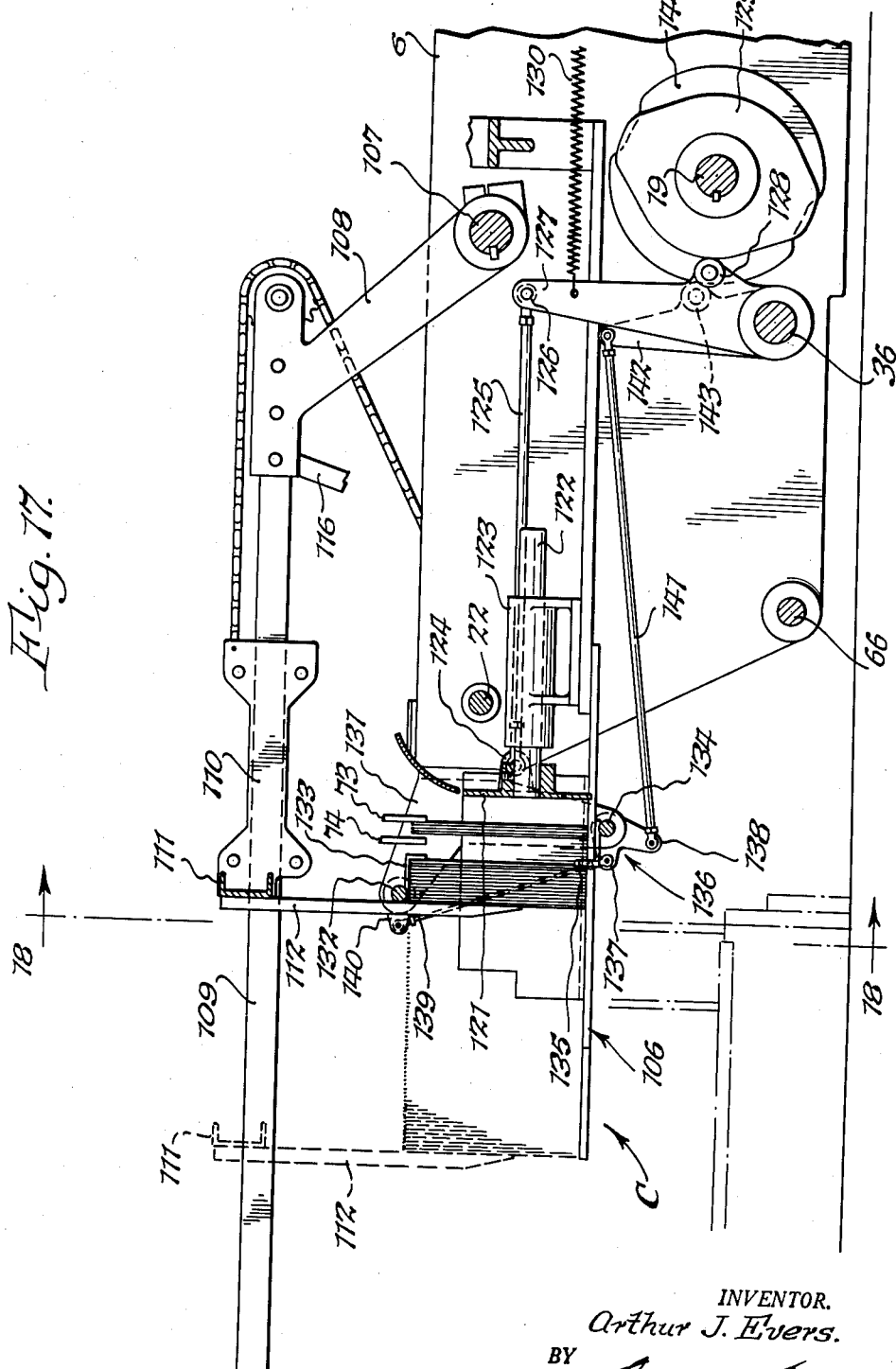

Jan. 3, 1956  A. J. EVERS  2,729,151
TRANSFER MECHANISM FOR BAGMAKING MACHINES
Filed July 31, 1952  12 Sheets-Sheet 9
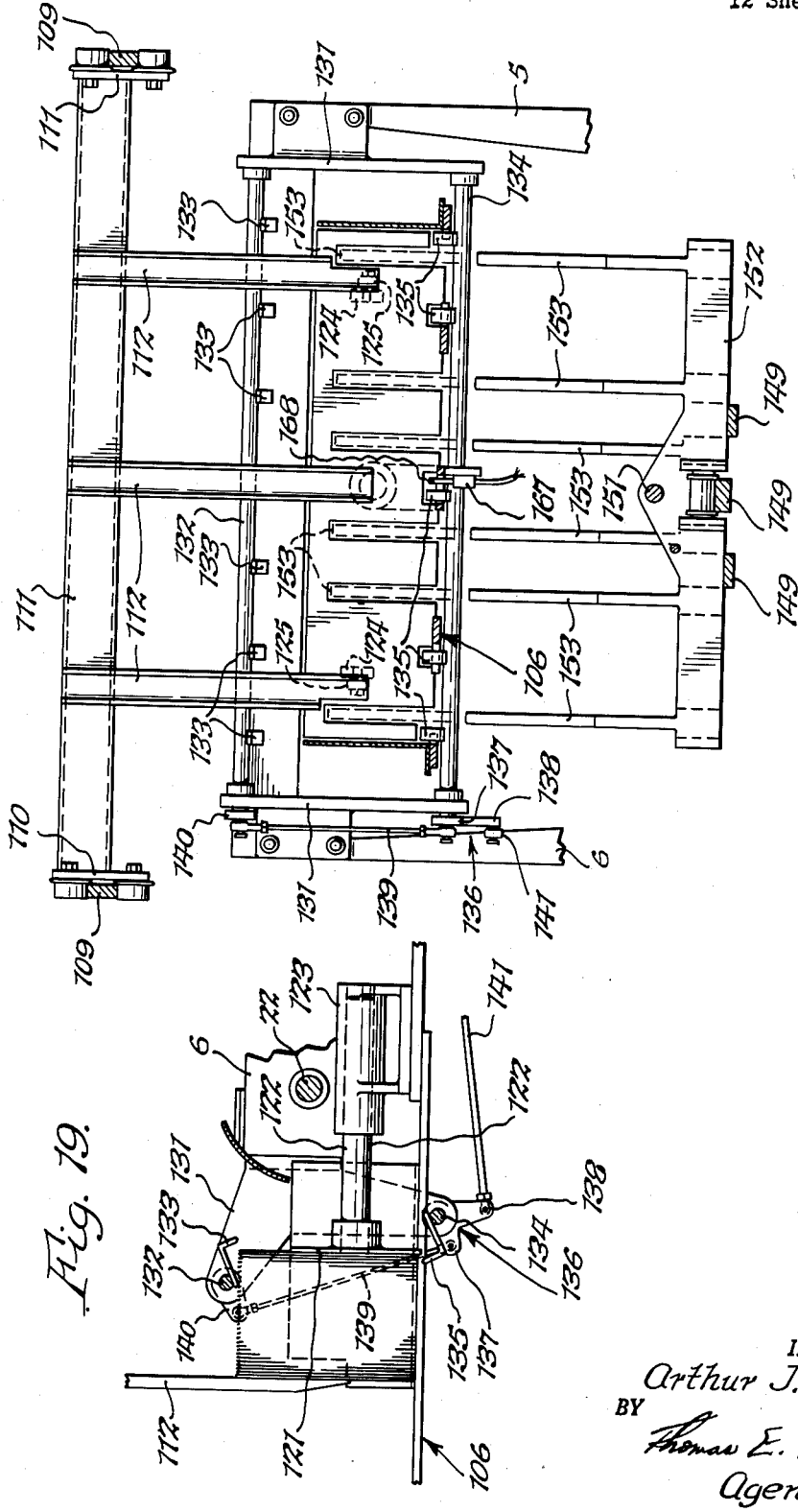
INVENTOR.
Arthur J. Evers.
BY
Thomas E. Tate
Agent.

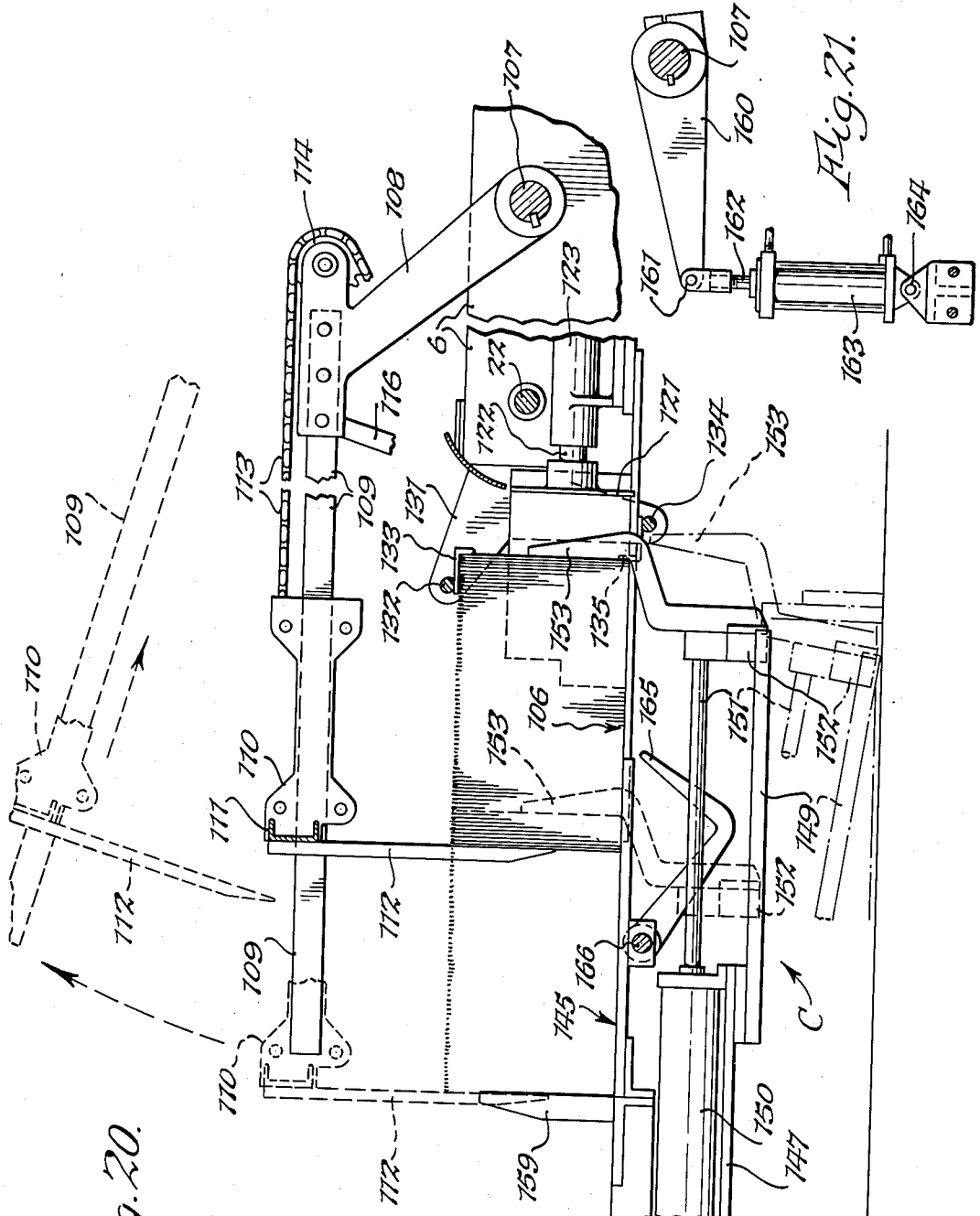

Jan. 3, 1956　　　　　A. J. EVERS　　　　　2,729,151
TRANSFER MECHANISM FOR BAGMAKING MACHINES
Filed July 31, 1952　　　　　　　　　　　　　12 Sheets-Sheet 11
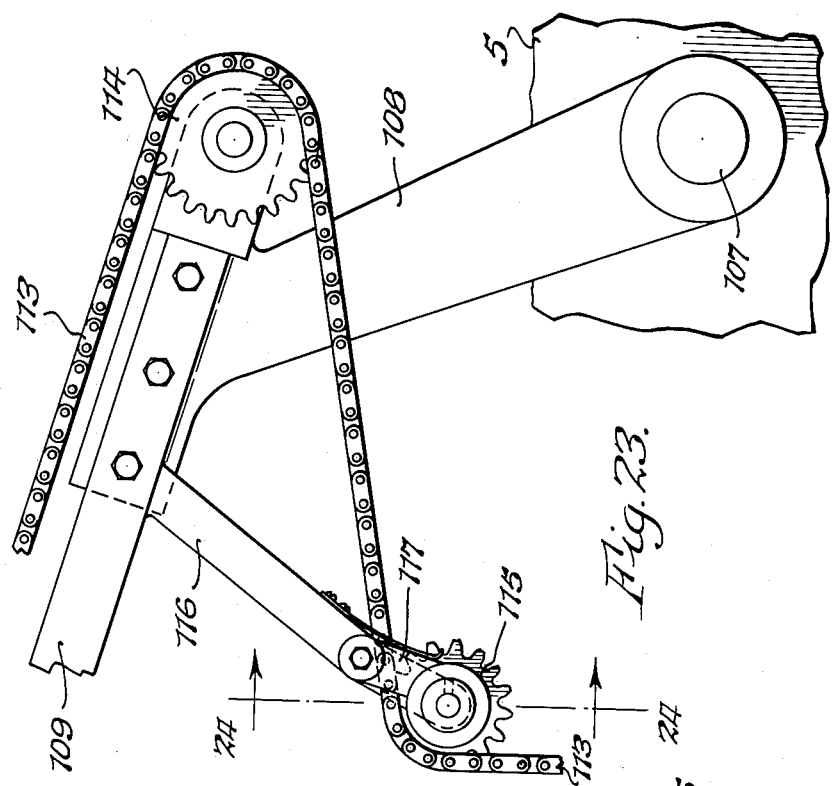
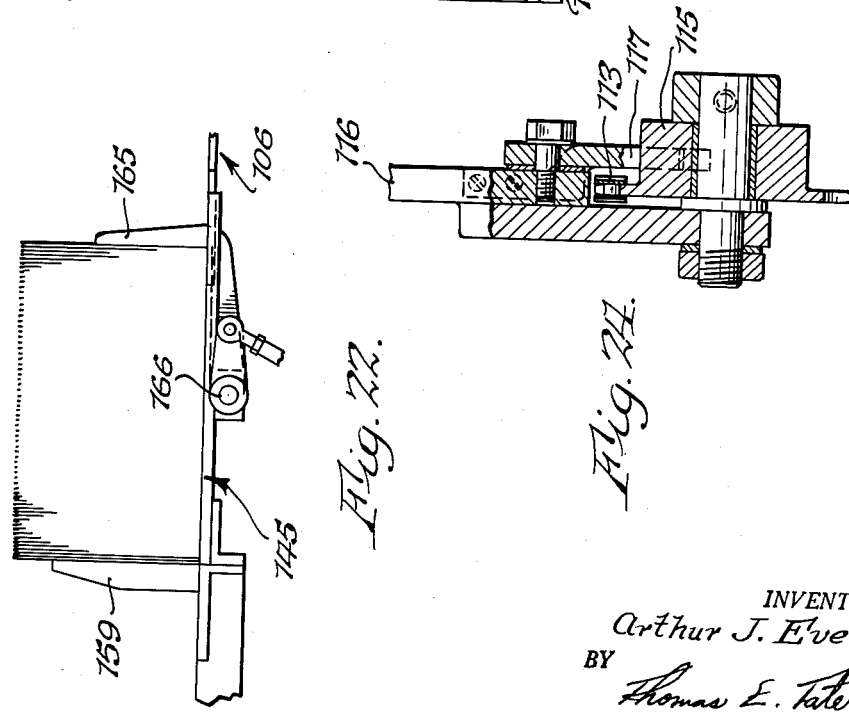
INVENTOR.
Arthur J. Evers.
BY Thomas E. Tate
Agent.

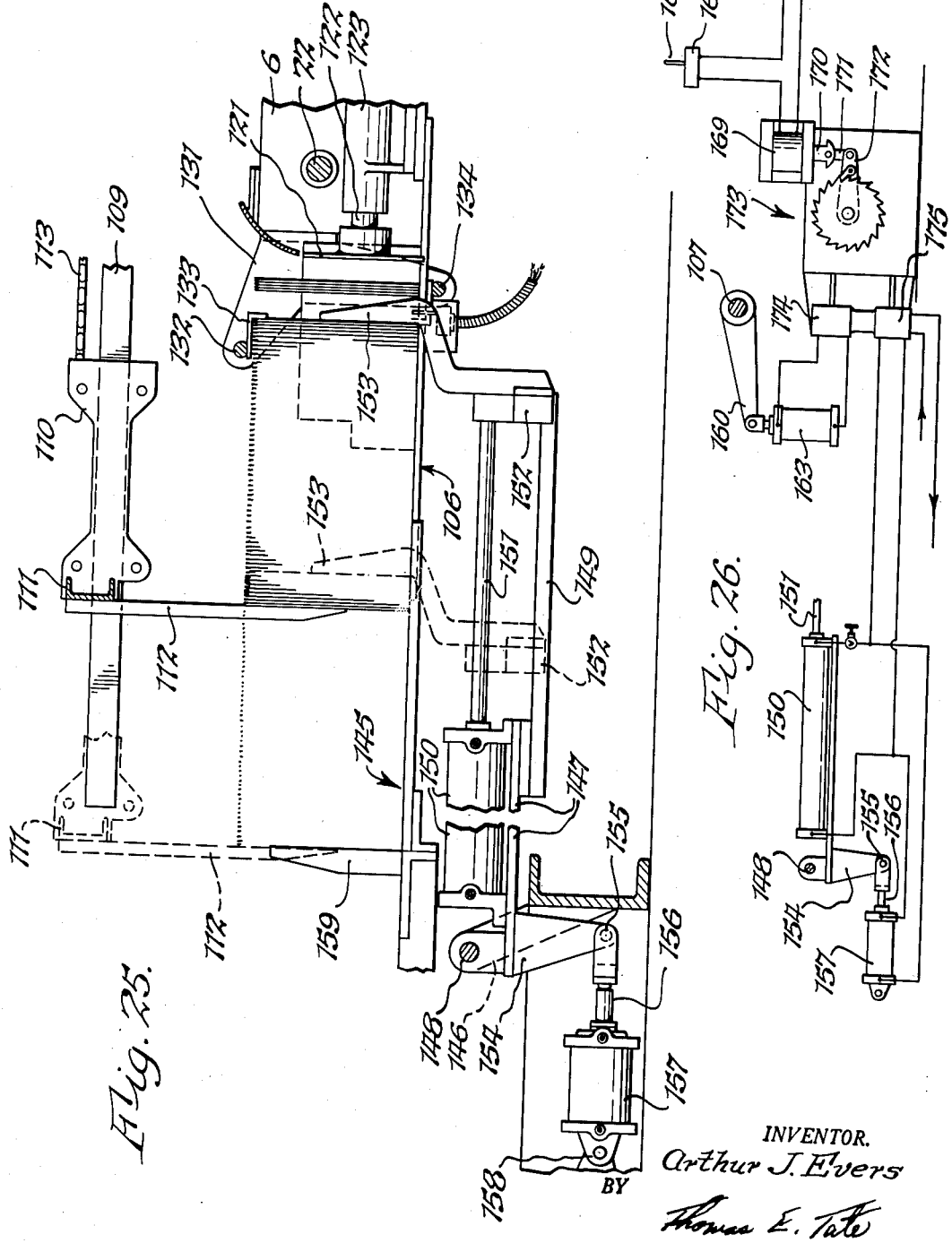

United States Patent Office 2,729,151
Patented Jan. 3, 1956

2,729,151

TRANSFER MECHANISM FOR BAGMAKING MACHINES

Arthur J. Evers, Brooklyn, N. Y., assignor to International Paper Company, New York, N. Y., a corporation of New York Application July 31, 1952, Serial No. 301,888

5 Claims. (Cl. 93—93)

This invention relates to new and useful improvements in bagmaking machinery and particularly seeks to provide a novel form of apparatus for receiving individual bags from the discharge end of a bagmaking machine, collecting them together in a series of groups each containing a predetermined number of bags, and consolidating a plurality of such groups together to form a bundle in which each group of bags is turned end for end with respect to the adjacent group in order that the assembled bundle may be of substantially uniform dimensions.

Earlier forms of delivery equipment for bagmaking machines have invariably received bags from the associated bagmaking machine and lined them up in face to face serial or shingled arrangement, whereupon it became necessary for the bags to be individually counted and separated and turned by hand.

Some improvements in the earlier forms of apparatus for this purpose have been made by the provision of automatic counters which after a predetermined number of bags had passed the counting station would either insert a tab between a pair of bags or would actually displace a bag slightly out of alignment with respect to the remainder of the bags lined up on the delivery mechanism. Even this improved type of delivery mechanism still required the manual removal of each counted group of bags and the manual alternate alignment thereof into assembled bundles.

Bag transfer and delivery apparatus constructed in accordance with this invention, however, provides novel means for assembling groups of bags each having a predetermined count without the use of separate counting apparatus and without the necessity of inserting tabs or displacing single bags out of line at periodic intervals. Furthermore, this apparatus provides means for automatically taking each successive group of bags and swinging it onto an assembling table in such a manner that alternate groups will lie on the table with their open ends disposed in opposite directions in order that the composite bundles made from a plurality of such groups may be of substantially uniform dimensions.

It is, therefore, an object of this invention to provide a novel form of bag-delivery and -transfer apparatus for use in connection with bagmaking machines, which receives bags from the associated bagmaking machine, separates them into a plurality of groups each having a predetermined count and assembles a plurality of groups into a bundle in which each group of bags is turned end for end with respect to the adjacent group.

Another object of this invention is to provide apparatus of the character stated in which the groups of bags are carried in a vertical position with the bottoms thereof down between upstanding lugs of a conveyor and at the end of the conveyor are swung through an arc of approximately 90° to a horizontal position and onto the surface of the assembly table.

A further object of this invention is to provide apparatus of the character stated in which the groups of bags as they are placed on the assembly table are moved in step by step advance resulting from the placement of each succeeding group of bags on the table and against the resistance of a movable back stop whereby to provide for the assembling of a bundle of bags comprised of a multiplicity of such groups.

A further object of this invention is to provide apparatus of the character stated in which the resilient back stop is automatically displaced after a predetermined number of groups of bags have been deposited on the assembly table and returned to its initial position to provide for the build-up of another bundle of bags on the assembly table.

A further object of this invention is to provide apparatus of the character stated in which the displacement and return of the resilient back stop are determined through suitable indexing and control devices.

A further object of this invention is to provide apparatus of the character stated which includes a pair of bag gripper assemblies located on each side of the conveyor and adapted to remove successively presented groups of bags from the conveyor and swing them downwardly onto the horizontal assembly table in alternate cycles whereby the groups of bags as they are deposited on the assembly table will be disposed with the bottoms of one group adjacent the tops of the next group.

A further object of this invention is to provide apparatus of the character stated which is positively driven from an associated bagmaking machine whereby its operative parts will be maintained in proper synchronization with respect to the frequency of delivery of bags from the bagmaking machine.

With these and other objects in view, the nature of which will be more apparent, the invention will be more fully understood by reference to the drawings, the accompanying detailed description and the appended claims.

In the drawings,

Fig. 3 is a fragmentary longitudinal section taken along line 3—3 of Fig. 2 and shows the cams and operative linkages for controlling the number of the bag picker fingers;

Fig. 4 is a fragmentary side elevation of the end of one of the bag picker fingers and shows the orbital path of movement followed by the finger during one cycle of operation;

Fig. 5 is an enlarged fragmentary longitudinal section taken along line 5—5 of Fig. 2 and shows the relationship between the stationary picker fingers and the cylinder of the associated bagmaking machine;

Fig. 6 is a fragmentary transverse section taken along line 6—6 of Fig. 3;

Fig. 7 is a fragmentary longitudinal section taken along line 7—7 of Fig. 2;

Fig. 8 is a fragmentary longitudinal section taken along line 8—8 of Fig. 16 and shows the cam and follower connections for cocking and uncocking the grippers;

Fig. 10 is an enlarged fragmentary longitudinal section taken along line 10—10 of Fig. 9 and shows details of the gripper and slide assembly;

Fig. 11 is a longitudinal section taken along line 11—11 of Fig. 10;

Fig. 12 is a view generally similar to Fig. 10 but shows the grippers in the released position;

Fig. 13 is an enlarged detail perspective showing the relationship between the gripper toggle trip lug and the trip bar at the moment that tripping of the toggle commences;

Fig. 14 is a fragmentary transverse section and shows the position of a group of bags as they are first removed from engagement with the conveyor lugs;

Fig. 15 is a view similar to Fig. 14 and shows the final position of the group of bags as they have been swung into horizontal position overlying the assembly table by the same group shown in Fig. 14;

Fig. 16 is an enlarged transverse section taken along line 16—16 of Fig. 1 and shows the relative positions of the various operating and control cams together with certain of their followers;

Fig. 17 is a fragmentary longitudinal section taken along line 17—17 of Fig. 16 and shows the bag pusher as well as the resiliently movable back stop and the pivotally mounted retaining fingers;

Fig. 18 is a transverse section of the mechanism shown in Fig. 17 and is taken along line 18—18 thereof;

Fig. 19 is a fragmentary detail longitudinal section of part of the mechanism shown in Fig. 17 and shows the bag-retaining fingers pivoted out of bag-engaging relationship and with the pusher near its maximum lefthand limit of movement;

Fig. 20 is a view generally similar to Fig. 17 but additionally shows certain mechanism used in conjunction with the assembly table and shows the upper limit of oscillation of the back stop after a full bundle of bags has been deposited on the assembly table;

Fig. 21 is an enlarged detail longitudinal section showing the operating cylinder for the back stop;

Fig. 22 is a detail view of a portion of the mechanism shown in Fig. 20 and shows clearly the manner in which retaining fingers associated with the assembly table are moved up into bag bundle engaging relationship;

Fig. 23 is an enlarged detail longitudinal section of the support for the back stop and shows the manner in which the frictional drag is provided;

Fig. 24 is an enlarged transverse section taken along line 24—24 of Fig. 23; and Figs. 25 and 26 show somewhat schematically the means by which the assembled bag bundle may be held prior to removal after having been assembled on the assembly table.

Figure 1:
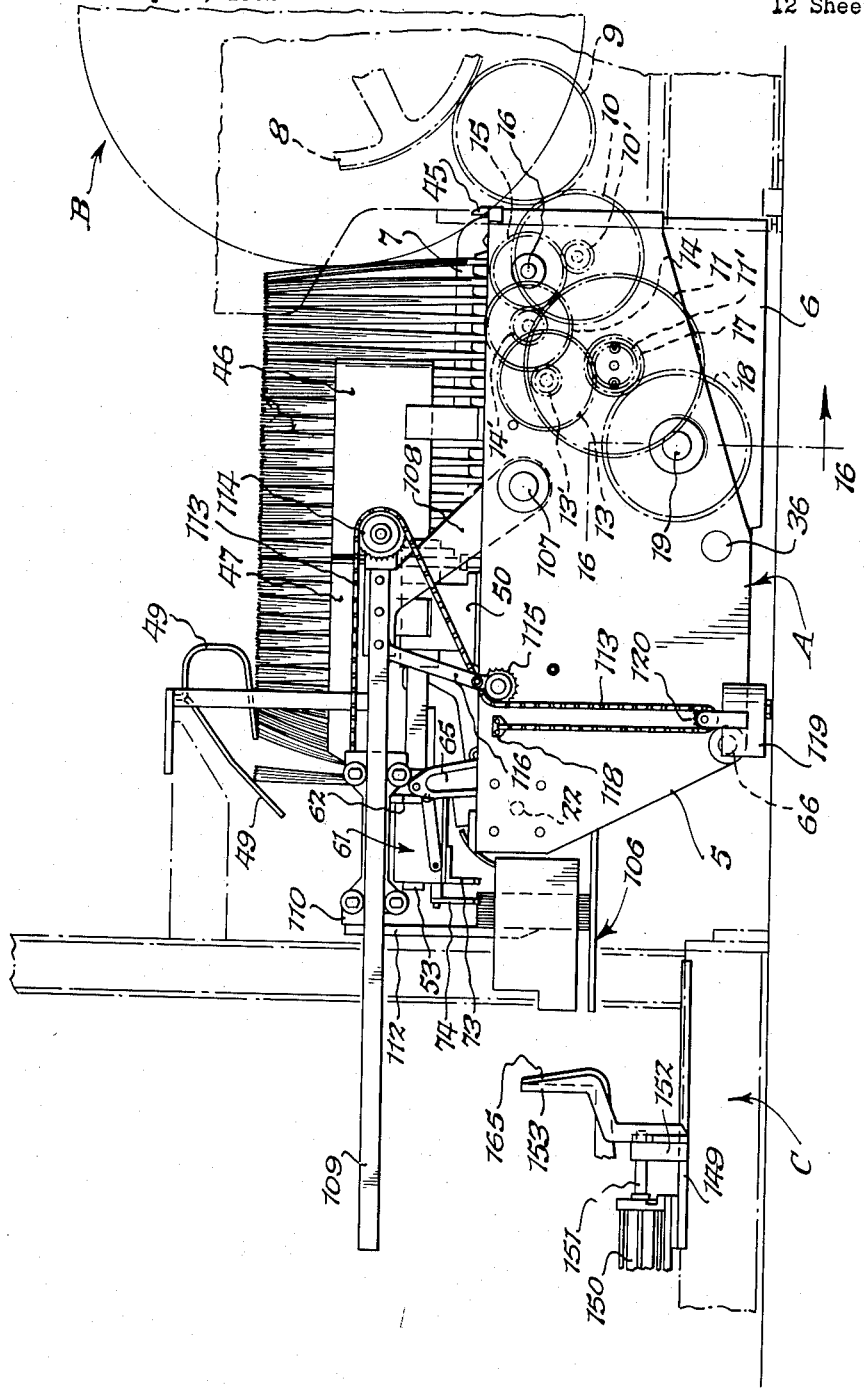
Fig. 1 is a side elevation of bag delivery and transfer apparatus constructed in accordance with this invention.

Referring to the drawings in detail, the invention as illustrated is embodied in bag transfer apparatus generally indicated at A, adapted to receive bags from the discharge station of the cylinder B of an associated bagmaking machine, collect the bags in a plurality of groups each containing the same number of bags, and assemble onto the work table of an associated delivery mechanism C a plurality of groups into successive bundles each containing the same number of groups. For convenience in understanding the nature of this apparatus and of its operation the detailed description will be divided into several phases comprising "General driving connections"; "Bag collecting, grouping and conveying"; "Bag transfer"; "Bundle formation and discharge"; and "Operation."

General driving connections

The transfer apparatus A includes a front frame member 5 and a rear frame member 6 provided with a gear box 7. This machine is adapted to be positively driven (see Figs. 1, 2 and 16) from the main cylinder gear 8 of the associated bagmaking machine through an intermediate gear 9 and a reduction gear train comprising in sequence an attached gear 10, 10' carried by a suitable stub shaft in the gear box 7, an attached gear 11, 11' rotatably mounted on one end of a transversely disposed rock shaft 12, an attached gear 13, 13' carried by a suitable stub shaft in the gear box, an attached gear 14, 14' carried by a suitable stub shaft in the gear box and a sprocket shaft drive gear 15 affixed to one end of a transversely disposed sprocket shaft 16. The attached gear 11, 11' is also provided with an intermediate gear 17 which meshes with a gear 18 affixed to one end of a transversely disposed main cam shaft 19.

Bag collecting, grouping and conveying

The sprocket shaft 16 carries a pair of sprocket gears 20, 20 aligned with a similar pair of sprocket gears 21, 21 affixed to a transversely disposed shaft 22 journalled between the frame members 5 and 6 (see Figs. 2, 3, 6, 7 and 9). An endless sprocket chain 23 is carried by each aligned pair of sprockets 20 and 21 and every other link thereof is provided with an outwardly extending stud 24 having a flat rear face and a rounded corner front face. The studs 24 are so proportioned that the spacing between adjacent studs along the upper straightaway of the chains is just sufficient to receive the bottom ends of a predetermined number of bags comprising a single group. The length of the studs is sufficient that when the chain 23 passes around the sprockets 20 at the intake end of the chain conveyor the outer ends become more widely spaced to receive bags therebetween after they have been released from the cylinder B of the associated bag machine.

The underside of the upper straightaway of the chains 23 are supported against sagging by a pair of flat-topped rails 25, 25 suitably mounted on fixed elements of the main frame. A pair of spaced bag supporting rails 26, 26 is secured on either side of the chains 23 with their upper faces lying in a plane slightly above the plane of the top surfaces of the chain links along the upper straightaway. Similarly, a bag supporting plate 27 is located between the chains 23 and together with the rails 26 serves to support the bag groups out of contact with the chain links as they are being advanced as a result of engagement between adjacent pairs of studs 24.

The intake ends of the rails 26 are provided with inwardly projecting extensions 28, each carrying one or more relatively thin, upwardly projecting stationary picker fingers 29 adapted to be received in corresponding grooves formed in the surface of the bag machine cylinder B. (See Fig. 5.) In the above described construction the ends of the bag supporting rails 26 and plate 27 adjacent the stationary picker fingers 29 serve as a stationary table for initially receiving successive bags as they are released from the cylinder of the bag machine and holding the same until a predetermined number of such bags have been deposited thereon to form a group. At this point movable means are provided to segregate each group as it is formed on the end portion of the bag-supporting rails and plate and to move the bottoms thereof in synchronization with the speed of advance of the conveyor lugs 24, whereupon the bottoms of each group of bags will become engaged between and advanced along the conveyor by cooperating pairs of lugs.

To this end two sets of opposed movable picker fingers are provided, one of which operates 180° out of phase with respect to the other in order to provide for the controlled accumulation and segregation of each formed group of bags from the next succeeding group. As will be best seen in Figs. 3 and 6 of the drawings, these mechanisms include a front picker arm 30 having its rear end (left end as viewed in Fig. 3) pivotally connected as at 31 to the upper end of a rock arm 32 journalled on the rock shaft 12 and provided adjacent its lower end with a cam follower 33. The cam follower 33 contacts and has motion imparted thereto by a cam 34 affixed to the main cam shaft 19. A tension spring 35 extends between the lower end of the rock arm 32 and a transverse frame brace rod 36 and serves to constantly maintain the cam follower 33 in contact with the cam 34.

The central portion of the movable picker arm 30 is pivotally connected as at 37 to the upper end of a pitman 38 having its lower end pivotally connected as at 39 to the short end of a generally horizontal rock arm 40 pivoted on the rock shaft 12. The intermediate portion of the other end of the rock arm 40 is provided with a roller cam follower 41 adapted to engage and be moved by a cam 42 affixed to the main cam shaft 19. A tension spring 43 extends between the end of the rock arm 40 and the transverse brace 36 of the frame and serves to constantly maintain the cam follower 41 in contact with the cam 42.

The right hand end of the picker arm 30 is provided with a laterally extending offset 44 carrying a pair of spaced upstanding picker fingers 45 adapted to be received in and pass along a portion of corresponding grooves formed in the surface of the adjacent cylinder cam B in order to become engaged behind a group of bags which has been temporarily disposed on the stationary table portion defined by the right hand ends of the rails 26, plate 27 and stationary picker fingers 29.

It will be seen that through the use of the cam, rock arm and pitman connections as described above the movable picker fingers 45 of the picker arm 30 will partake of movement which follows a compound orbital path, as illustrated in Fig. 4 of the drawings. It will be noted that the upper portion of this orbit of travel lies in a straight line parallel to the upper surface of the straight-away portion of the conveyor, leads into a downward returning arcuate path and again rises as it approaches the right-hand limit of movement. A final abrupt rise takes place before the picker finger again reaches the straight-line portion of movement, and it is during this portion of the orbital path of travel that the picker fingers move up behind the group of bags temporarily held on the table portion and to the left at a rapid rate of speed in order that the next bags being released from the cylinder B will drop onto the table portion behind the movable picker fingers 45 and between them and the stationary picker fingers 29. Inasmuch as the initial contact of the picker fingers 45 with the bag group standing on the table occurs as seen in Fig. 3 of the drawings to the right of the position at which the bag group can be engaged by the conveyor studs 24, the lefthand movement of the picker fingers 45 must first begin at a rate of advance greater than the rate of advance of the conveyor in order that the bag bottoms may become engaged between the studs 24 and then must slow down to a speed of advance equal to that of the conveyor in order that the bag bottoms may become fully engaged between a pair of the studs 24.

As viewed in Fig. 3 of the drawings it will be particularly observed that two sets of the movable picker fingers 45 are provided. The second or rearmost set operates 180° out of phase with the front set described in detail above, and it will be seen that the front set of pickers is about to engage a newly deposited group of bags whereas the rear set has already engaged the preceding group of bags and is moving along at a speed of advance equal to that of the conveyor, pending the time at which the trailing lug 24 catches up with the lead lug due to the movement of the conveyor chain around the sprocket gear 20.

It will be observed from the above description that the lateral extension 44 carrying the right-hand set of movable pickers 45 as viewed in Fig. 3 extends rearwardly from the picker bar 30. The lateral extension 44 of the rear picker bar 30, therefore, must of necessity extend forwardly in order that both sets of picker fingers 45 may be properly aligned with respect to the bags they are adapted to engage. In a manner of speaking, the motion of one set of picker fingers relative to the other may be likened to a man twiddling his thumbs.

It will be appreciated that through the use of the foregoing type of bag collecting, grouping and conveying mechanism the actual collection and grouping of bags on the conveyor will be effected in a self-counting, self-determining manner as a result of the positive drive from the cylinder of the bag machine and the fixed gear ratios between the bag machine and this entire transfer apparatus. Thus for each cycle of each set of picker fingers 45 a new group of bags will be introduced to the conveyor section and the number of bags in each group will be determined by the operative ratios between the number of revolutions made by the bag machine cylinder per cycle of operation of the picker fingers. Thus if this apparatus were timed for one cycle of each set of picker fingers per revolution of the bag machine cylinder, and the cylinder had two bottoming stations on it, each group of bags on the conveyor would consist of two bags. If the timing were changed such that the cylinder made two revolutions for each cycle of each set of picker fingers each bag group would be comprised of four bags. Accordingly, by any desired selection of operating ratios the number of bags per group may be predetermined and will remain constant.

As the bag groups are moved along by the studs 24 of the conveyor they remain in upright position and are assisted in being so maintained by a first pair of guide plates 46, 46 adjustably mounted on suitable elements of the main frame and a second pair of guide plates 47, 47 similarly mounted on suitable elements of the main frame. Since the plates 47 are positioned to include the discharge end of the conveyor it has been found desirable to provide spring-biasing means generally indicated at 48 to cause the left-hand ends thereof as viewed in Figs. 1 and 2 to be biased towards each other in order to retain proper control over movement of the bag groups as they are being transferred from the conveyor to the bundle-assembling work table. The upper ends of the bag groups may be prevented from undue flexure in the direction of advance along the conveyor by a suitably shaped wire guide 49 positioned thereover adjacent the discharge end of the conveyor.

Bag transfer

As each bag group reaches the discharge end of the conveyor means are provided for first lifting the bag group upwardly out of engagement between the carrying studs 24 and then swinging the group downwardly through a helical path onto the surface of an associated work or assembly table. To this end two sets of movable gripper assemblies are provided and are located in symmetrical opposition on the front and rear sides of the apparatus, and although similarly constructed they operate 180° out of phase. Each of these assemblies includes a mounting bracket 50 secured to the main frame and extending upwardly and inwardly towards the bag groups carried by the conveyor and terminates at its outer end in a bearing boss 51 having its axis horizontally disposed in parallelism with the longitudinal axis of the conveyor section. A rock shaft 52 is oscillatably carried within the bearing boss 51 and includes a long extended end portion 53 of square cross section. The other end of the shaft 52 extends a short distance beyond the bearing boss 51 and carries at its outer end a rock arm 54 rigidly attached thereto. The outer end of the rock arm 54 is pivotally attached to the upper end of a pitman 55 having its lower end pivotally connected as at 56 to the outer end of a generally horizontal rock arm 57 carried by the rock shaft 12. A cam follower 58 is rotatably mounted on the rock arm 57 in the central portion thereof and engages with and has movement imparted thereto by a cam 59 rigidly mounted on the main cam shaft 19. The above described connections effect a cyclic oscillatory movement to the shaft 52 during each revolution of the main cam shaft 19. A tension spring 60 extends between the upper pivot of the pitman 55 and a suitable stationary frame member and serves to constantly pull down on the rock arm 54 and the pitman 55 to maintain the roller cam follower 58 constantly in contact with the cam 59.

The square projecting end 53 of the rock shaft 52 carries a gripper slide generally indicated at 61 provided with an upwardly projecting segment 62 having a peripheral groove 63 adapted to receive a roller cam follower 64 carried by the upper end of a long rock arm 65 pivoted at its lower end on a pivot stud 66. A pitman 67 is pivotally connected at one end to the rock arm 65 at a point intermediate the ends thereof and at its other end to the upper end of a vertically extending rock arm 68 mounted on the rod 36. The rock arm 68 is provided with a short lateral extension 69 which carries a roller cam follower 70 adapted to engage and have movement imparted thereto by a cam 71 affixed to the main cam shaft 19. A tension spring 72 extends between the upper portion of the rock arm 65 and a transverse frame member to constantly bias the rock arm 65, pitman 67 and rock arm 68 in a direction to cause the roller cam follower 70 to be maintained in constant engagement with the cam 71. The foregoing cam and linkage connections with the segment 62 of the gripper slide 61 provide means for reciprocating the slide back and forth along the shaft end 53 while permitting oscillation thereof as effected by the cam 59 and its associated linkage with one complete cycle of oscillation and of reciprocation occurring for each revolution of the main cam shaft.

The gripper slide 61 is provided on a lower face with a depending stationary gripper 73 (see Figs. 10, 11 and 12). A movable gripper 74 is disposed in opposition to the stationary gripper 73 and is dependably carried by a bar 75 reciprocably mounted in a slideway 76 formed in the slide 61. The right-hand portion of the bar 75 as viewed in Fig. 11 is provided with a rectangular slot 77 within which is positioned a rigidly affixed stud 78 having an abutment 79 formed thereon. A compression spring 80 is interposed between the abutment 79 and the opposite end of the slot 77 formed in the bar 75 and constantly tends to bias the bar to the right in order that the movable gripper 74 carried thereby may be brought into clamping relationship with respect to the stationary gripper 73.

Toggle opening and closing means are provided for the movable gripper 74 and include a transversely disposed pivot pin 81 which passes through the bar 75 and elongated clearance openings 82, 82 formed in opposite side walls of the slide 61 with the ends of the pin 81 projecting beyond the associated side wall faces. Each side of the slide 61 is provided with a toggle link 83 having one end mounted on the associated end of the transverse pin 81 and its other end pivotally connected as at 84 to a toggle cocking and uncocking rock arm 85 secured to a transversely disposed pivot shaft 86 extending through the slide 61. The arms 85 are connected by a depending, transversely extending toggle cocking and uncocking bar 87 adapted to be controlled through suitable cam and linkage connections as will be hereinafter described.

It will be seen by reference to Figs. 7, 8, 9 and 16 of the drawings that means are provided for cocking and uncocking the toggle assembly on the slide 61 in order to bring the movable gripper 74 into and out of bag bundle gripping relationship to the stationary gripper 73. To this end, as shown particularly in Figs. 7 and 9, there is provided a laterally disposed hub 88 pivotally carried by a short shaft 89 mounted in upstanding lugs 90, 90 carried by a suitable element of the main frame. The hub 88 carries a relatively long toggle trip arm 91 which extends upwardly and to the right as viewed in Fig. 7 and is provided at its outer end with a laterally projecting toggle trip cam 92 adjustably mounted thereon. The hub 88 is also provided with a toggle cocking arm 93 considerably shorter than the toggle trip arm 91 and which extends upwardly and to the left as viewed in Fig. 7. The toggle cocking arm 93 is provided at its upper end with a contact element 94 adapted to be brought into and out of engagement with the toggle cocking bar 87 carried by the slide 61. The arms 91 and 93 are braced in their angularly diverged relationship by a web 95 extending therebetween and connected as at 96 to one end of a pitman 97 having its other end pivotally connected as at 98 to the upper end 99 of a bell crank 100 carried on the rock shaft 12. The bell crank 100 also includes a generally horizontally extending arm 101 rotatably carrying intermediate its ends a roller cam follower 102 adapted to engage and have movement imparted thereto by a cam 103 rigidly affixed to the main cam shaft 19. A tension spring 104 extends between the outer end of the arm 101 of the bell crank and a suitable member of the main frame and tends to constantly maintain the roller cam follower 102 in engagement with the associated cam 103.

The foregoing cam and linkage connections with the web 95 provide means for bodily oscillating the arms 91 and 93 in synchronization with the reciprocatory movements of the slide 61 in order to effect opening and closing of the grippers 73 and 74 in properly timed sequence.

In order to avoid any possibility of the bags accidentally contacting the ends of the squared shaft portions 53 as each bag group is swung towards deposition onto the assembling table each slide 61 may be provided with a generally triangularly shaped wire deflector 105.

*Bundle formation and discharge*

Figure 2:
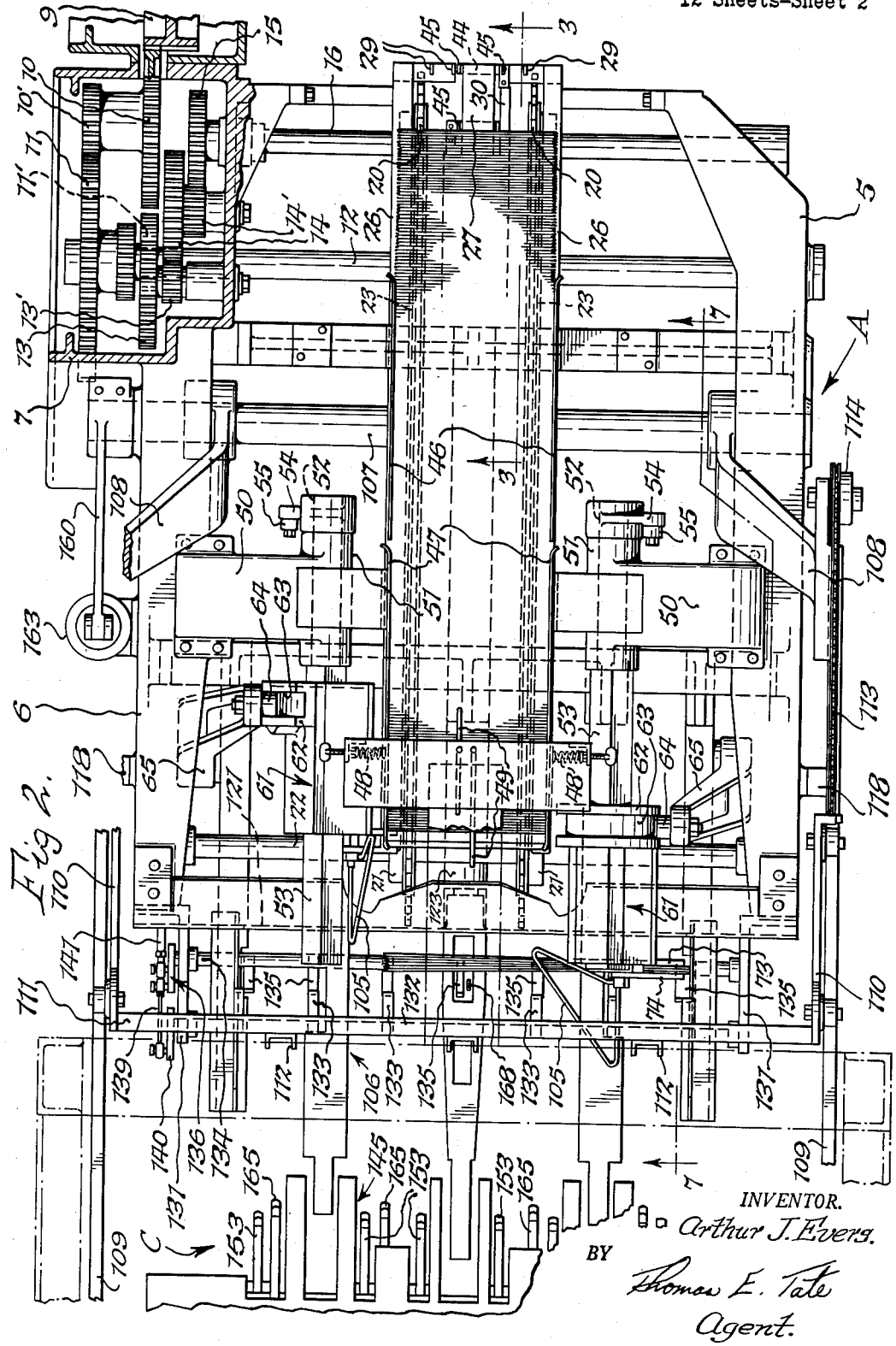
Fig. 2 is a top plan view thereof in which certain of the elements have been deleted in the interests of clarity.
Figure 9:
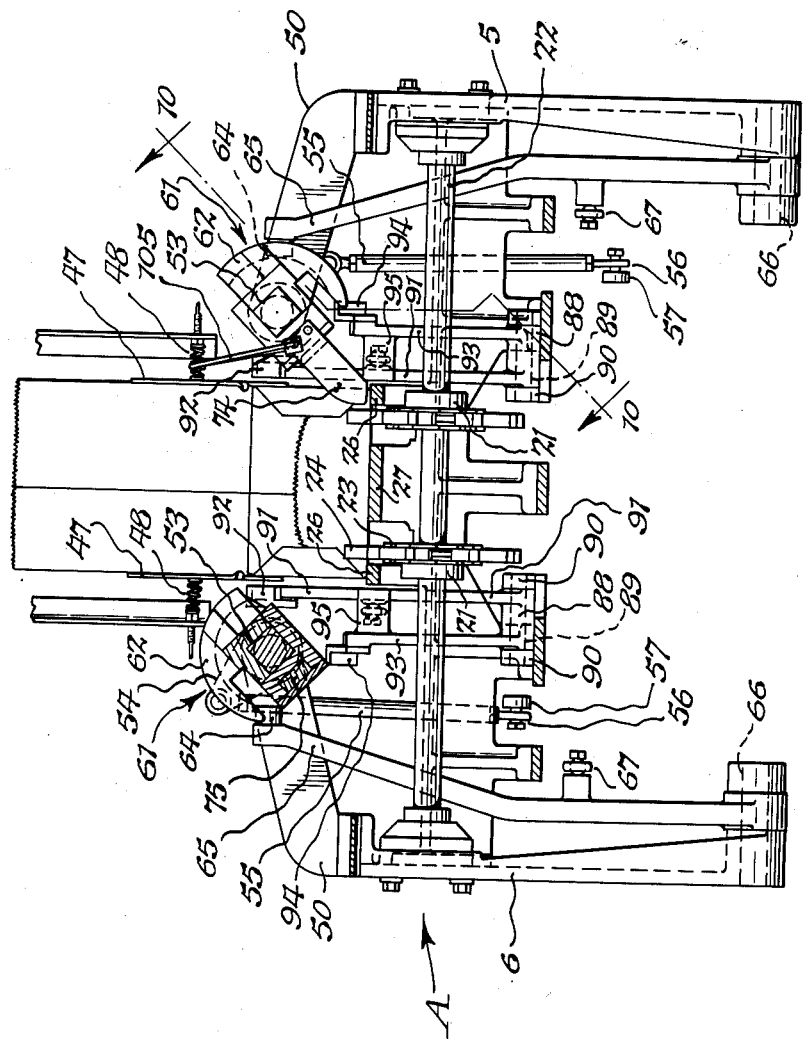
Fig. 9 is a transverse section taken along line 9—9 of Fig. 7.

After each bundle of bags is removed from the conveyor by one or the other set of grippers carried by the slides 61 it is swung laterally to the left as viewed in Fig. 1 of the drawings and downwardly along a helical path and deposited on its side on a work table generally indicated at 106 in connection with which a resiliently mounted back stop or abutment is provided against which the bag groups are pushed and held thereagainst by cyclically displaceable retaining fingers. To this end a transversely disposed rock shaft 107 (see Figs. 1, 2 and 17) is journalled between the front and rear frame members 5 and 6 and carries thereon a spaced pair of upwardly extending mounting arms 108, 108. Each of the arms 108 carries a normally horizontal track 109 upon which is carried a roller-mounted carriage 110. The carriages 110 are connected by a cross-piece 111 provided with a plurality of spaced parallel depending abutment fingers 112 normally positioned with their lower ends overlying the work table 106 in such a manner that bag groups deposited thereon may be pushed against the fingers which thus serve as a back stop and aid in retaining the bags in alignment while resting on their side edges.

Means are provided for constantly biasing the carriages 110 together with the abutment fingers 112 towards the right as viewed in Fig. 1 of the drawings in order to exert constant but light pressure against the bags supported on the work table. To this end a chain 113 is secured to the rear (right) of each carriage 110 and first passes over an idler sprocket 114 rotatably carried by the arm 108 and passes around an idler sprocket 115 rotatably mounted on a depending arm 116 also carried by the main supporting arm 108. The idler sprocket 115 is adapted to have its rotation frictionally retarded as by a spring-loaded snubber bar 117 pivotally mounted on the depending arm portion 116 and engageable with the hub of the sprocket 115. From the sprocket 115 the chain 113 hangs in a dependent loop and has its free end secured to a lug 118 on the main frame. A counter-weight 119 provided with a freely rotatable sprocket 120 is carried in the bight of the loop thus formed in the chain 113 and constantly tends to bias the shaft 107 and the arms 108 and associated mechanisms carried thereby in a counter-clockwise direction as viewed in Fig. 1.

As each bag group is deposited on the work table 106 by the grippers 73 and 74 (see Fig. 17) means are provided to displace each group to the left into contact with the depending abutment fingers 112 or into contact with previously deposited bag groups and includes a transversely disposed packer or pusher plate 121 carried by a plunger 122 reciprocably mounted in a bearing boss 123. The rear face of the packer plate 121 is provided with a pair of lugs 124, 124, each of which is pivotally connected to one end of a generally horizontal pitman 125 connected at its other end as at 126 to the upper end of a rock arm 127 carried by the cross brace 36. The rock arm 127 is provided with a short lateral extension carrying a roller cam follower 128 adapted to engage and have movement imparted thereto by a cam 129 rigidly affixed to the main cam shaft 19. It will be noted that the cam 129 is a two-lobed cam in order that for each revolution of the cam shaft 19 two cycles of reciprocation of the packer plate 121 may be effected. A spring 130 extending between the upper portion of the rock arm 127 and an associated frame member serves to constantly bias the rock arm in a clockwise direction to maintain the cam follower 128 constantly in contact with the cam 129.

As each group of bags is moved by the packer 121 towards engagement with the resilient abutment fingers 112 means are provided for restraining the bags against return movement, that is, movement in the right-hand direction as viewed in Fig. 17. These means include a pair of brackets 131, 131 (see Fig. 18) mounted on the main frame and carrying an upper transversely disposed rock shaft 132 journalled therebetween and provided with a plurality of spaced depending retaining fingers 133. Similarly, the lower ends of the brackets 131 carry a rock shaft 134 provided with a plurality of upwardly projecting retaining fingers 135. It will be noted that the rock shafts 132 and 134 do not lie in the same vertical plane and consequently the retaining fingers 133 are directed oppositely to the fingers 135 in order that the ends thereof may be disposed in substantially vertical alignment when the fingers are in bag-retaining position. Oscillation of the rock shafts 132 and 134 counterclockwise as viewed in Fig. 19 of the drawings will cause the fingers 133 and 135 to move apart and provide clearance for movement of the packer plate 121 and an associated group of bags propelled thereby and when oscillated in a clockwise direction will cause the fingers 133 and 135 to be moved towards each other in position to overlap face portions of the bags supported against the abutment fingers 112. In this connection it will be noted that the outer or left-hand face of the fingers 135 will contact the bags and the inner left-hand face of the fingers 133 will contact the bags as shown particularly in Fig. 17 of the drawings.

One end of the rock shaft 134 is provided with a bell crank generally indicated at 136 having a laterally projecting arm 137 and a depending arm 138. The arm 137 is pivotally connected to the lower end of a pitman 139, the upper end of which is pivotally connected to a rock arm 140 affixed to the corresponding end of the upper rock shaft 132. The depending arm 138 of the bell crank is pivotally connected to one end of a pitman 141, the other end of which (see Fig. 17) is pivotally connected to the upper end of a rock arm 142 carried by the transverse member 36. The rock arm 142 is provided with a lateral extension rotatably carrying a roller cam follower 143 adapted to contact and have movement imparted thereto by a two-lobed cam 144 affixed to the main cam shaft 19.

It may be noted at this point that of all of the cams mounted on the cam shaft 19 it is only cam 144 which appears as a single unit. All of the remaining cams are duplicated on opposite sides of the central line of the machine and, with the exception of the packer cams 129, the set of cams on the front half are disposed 180° out of phase with those on the rear half in order that alternate bag groups may be handled in properly timed sequence.

After a sufficient number of groups of bags have been deposited on the work table 106 to form a bundle containing a predetermined number of bags, means are provided for moving the entire assembled bundle from the work table laterally onto a discharge or delivery table 145 lying in the same plane as that of the work table. This portion of the mechanism is best shown in Figs. 18, 20, 25 and 26 of the drawings and includes an upwardly extending mounting bracket 146 rigidly affixed to a transverse frame member of the base of the machine. A mounting plate 147 is pivotally carried by the bracket 146 as by lug and pivot pin connections generally indicated at 148 and is provided with a lateral slideway 149 extending to the right as viewed in Figs. 20 and 25 of the drawings. An air cylinder 150 having a plunger 151 is affixed to the top of the mounting plate 147 and the outer end of the plunger 151 is affixed to the center of a transversely positioned slide block 152 provided with a plurality of upwardly extending spaced parallel fingers 153.

The mounting plate 147 is provided with a depending arm 154 extending below the pivot connections 148 and has its lower end pivotally connected as at 155 to the plunger 156 of an air cylinder 157 pivotally connected to the base of the main frame as at 158.

The normal position of the mechanism just described is such that the mounting plate 147 and attached devices incline downwardly and to the right as indicated in dotted lines in Fig. 20 of the drawings in order that the fingers 153 may be normally maintained below the level of the work table 106 to permit movement of successive bag groups thereover under the influence of the packer plate 121. After a bundle of bags has been completely assembled on the work table 106 the air cylinder 157 becomes effective to oscillate the mounting plate 147 and its associated devices about the pivot 148 to raise the fingers 153 through suitable slots formed in the work table 106 into position where the upper ends thereof project above the work table and engage the rear (right) face of the bag bundle. At this point the cylinder 150 becomes effective to draw the plunger 151 and slide block 152 to the left as viewed in Fig. 25 so that the fingers 153 move the entire bag bundle to the position indicated in dotted lines overlying the delivery table 145 against the resistance of the abutment fingers 112 until the bundle has been displaced a distance sufficient to become engaged against a plurality of abutment stops 159 projecting upwardly from the surface of the delivery table 145.

At this point means are provided to lift the abutment fingers 112 out of engagement with the bag face and return the same to their initial position preparatory to the assembling of the following bundle of bags. To this end the rear end of the rock shaft 107 projects slightly beyond the rear frame member 6 and has rigidly affixed thereto a laterally projecting rock arm 160, the outer end of which as shown in Fig. 21 of the drawings is pivotally connected as at 161 to the upper end of the plunger 162 of an air cylinder 163 pivotally connected to the base of the machine as at 164. It will be apparent that operation of the cylinder 163 will effect oscillation of the rock shaft 107 in a clockwise direction to lift the rails 109 to the dotted line position indicated in Fig. 20 of the drawings to disengage the abutment fingers from the bag bundle and to permit the counterweight 119 carried in the bight of the chain 113 to become effective to move the carriages 110 and the abutment fingers 112 back to their initial position adjacent the arms 108. By reversing the operation of the cylinder 163 the rock shaft 107 will be oscillated in a counter-clockwise direction to return the rails 109 back to the horizontal position so that the abutment fingers 112 will be again positioned in the path of travel of the bag groups being deposited on the work table 106.

Once the bag bundle has been completely displaced into engagement against the upstanding abutment stops 159 by lateral movement of the fingers 153 it may be desirable to employ supplementary clamping means to hold the bundle on the delivery table in order to permit the immediate return of the fingers 153 to their normal inoperative position below the level of the work table 106. Accordingly, a plurality of clamp fingers 165 may be attached to a rock shaft 166 pivotally mounted on the underside of the delivery table 145 and projectable through suitable slots in the delivery table 145 into engagement with the right hand face of the formed bag bundle. This would of course, permit tying or banding of the bag bundle while on the delivery table and at the same time will permit the remaining portions of the mechanisms to commence the collection and formation of a subsequent bundle of bags on the work table 106.

While it is, of course, entirely possible to provide manually operable devices for controlling the operation of the cylinders 150, 157, 163 and the clamp fingers 165, manual operation of this nature would present difficulty in sequential timing of movements of the mechanisms thereof, particularly with respect to the operation of the cylinder 157 to raise the fingers 153 into bag-engaging position at such times as the predetermined size of bundle has been accumulated on the work table 106. Therefore, in Fig. 26 of the drawings there is shown somewhat schematically devices for automatically operating the above mentioned cylinders and the fingers in properly timed sequence. A normally opened micro-switch 167 having an upstanding actuating toggle 168 is connected to a solenoid 169 having a plunger 170 connected by a link 171 to the left arm 172 of indexing and control mechanism generally indicated at 173. The control mechanism 173 is adapted to effect operation of a reversible valve 174 operatively connected to the cylinder 163. The control mechanism 173 also controls a reversible valve 175 operatively connected to the cylinders 150 and 157.

The micro-switch 167 is located beneath the work table 106 adjacent the conveyor end thereof and the toggle 168 projects slightly above the level of the work table in position to be contacted and displaced sufficiently to close the micro-switch as a result of passage of each bag group being pushed thereover by the packer plate 121. Each closing of the micro-switch in this manner will, of course, effect one actuation of the solenoid 169 and one index step of advancement to the ratchet-driven indexing and control mechanism 173. It will be appreciated that each index step to the control mechanism 173 represents the passage of one group of bags onto the work table 106 and consequently the number of groups to be deposited on the work table before the fingers 153 are raised into bag-engaging position is determined by the setting or adjustment of the indexing and control mechanism. If it were to be assumed that 50 groups of bags were to comprise a single bundle then the indexing and control mechanism should be adjusted in such a way that the valves 175 and 174 will be operated at the end of 50 indexing steps to remove the bag bundle from the work table onto the delivery table 145.

*Operation*

It is believed that the operation of this machine will be apparent from the foregoing description, but in order to more closely tie in the sequential and overlapping functions of some of the elements one complete cycle of operation of the front set of grippers will now be described.

With the gripper slide 61 on the front of the machine at its full limit of right-hand movement the slide has also been oscillated by action of the cam 59 and its associated follower and link connections to its maximum limit of downward movement to clear the grippers 73 and 74 from the lateral edges of the bag groups as they are carried by the studs 24 of the conveyor. The toggle trip arm 91 has been swung to its right-hand limit of oscillation by action of the cam 103 and its follower and linkage connections and does not quite contact the toggle trip bar 87 on the underside of the gripper slide 61. The short toggle cocking arm 93 which moves bodily with the arm 91 does not engage any other part at this stage of the cycle of operation.

The gripper slide then begins to oscillate under control of the cam 59 to commence raising the grippers 73 and 74 upwardly towards engagement on either side of a group of bags carried between two of the conveyor studs 24. At the same time the cam 71 and its associated follower and linkage connections, including the long rock arm 65, begin to cause the gripper slide 61 to start its left-hand motion along the squared shaft portion 53. Simultaneously the cam 103 starts to oscillate the toggle trip arm 91 and cocking arm 93 counterclockwise to break the toggle formed by the links 83 and arms 85 and cause the grippers 73 and 74 to clamp a bag group on the conveyor. Immediately prior to the time at which the toggle is broken the left-hand movement of the slide 61 along the squared shaft 53 has increased in speed to equal the speed of advance of the conveyor and oscillation of the slide has continued to an amount sufficient that the grippers 73 and 74 are raised sufficiently that the ends thereof are positioned on either side of a bag group held on the conveyor and are disposed at almost right angles to the front of the bag group in the relative position shown in Fig. 14 of the drawings. The left-hand motion of oscillation of the toggle arms 91 and 93 continues to their left-hand limit of oscillation while the gripper slide 61 is being further oscillated and slid along the squared shaft portion 53 to raise the grippers and the bag group held therebetween an amount sufficient to lift the bag bottoms clear of the studs 24. At this point the relative position between the bag group and the conveyor studs is as shown in Fig. 14.

The left-hand lateral motion of the gripper slide 61 now continues in order to align the bags with the end of the work table 106 ahead (left) of the reciprocatory bag packer plate 121. As the slide 61 approaches its left-hand limit of motion oscillation of the slide takes place to swing the bag group from the position shown in Fig. 14 through more than 90° of arc to the position shown in Fig. 15 onto the work table 106. This combined lateral sliding and oscillation of the slide 61 causes the bag group to travel through a generally helical path. At this point the toggle cocking bar 87 on the slide 61 is in alignment with the short toggle cocking arm 93. Before right angle sliding of the gripper slide 61 takes place clockwise oscillation of the toggle cocking arm 93 and trip arm 91 begins so that the short cocking arm 93 engages the toggle bar 87 and cocks the toggle to open the grippers 73 and 74 and release the bag group. This motion of the arms 91 and 93 continues until they have been returned to their initial starting position at the right-hand limit of oscillation as viewed in Fig. 7 of the drawings. Now return oscillation of the gripper slide 61 takes place to again align the grippers 73 and 74 just clear of the lateral edges of the bags on the conveyor. Right-hand movement of the slide 61 now takes place to return it to its starting position to complete one cycle of operation.

It will be appreciated that the complementary set of grippers and actuating elements therefor on the rear side of the machines similarly are operated, but 180° out of phase with respect to the gripper operation just described in order that successive bag groups may be handled alternately from the front and rear of the conveyor and deposited onto the work table 106 in such a manner that alternate groups have their own ends extending in opposite directions.

It is, of course, to be understood that various details of arrangements and proportions of parts may be modified within the scope of the appended claims.

I claim:

1. Bag transfer apparatus including means for receiving individual vertically positioned bags from the discharge station of an associated bagmaking machine, means for collecting a plurality of said bags to form a group containing a predetermined number thereof, means for conveying successive bag groups to a transfer station, a work table located adjacent the transfer station of said conveying means, means for removing each successive bag group from said conveying means and transferring it onto said work table, said transferring means being effective to deposit alternate bag groups edgewise onto said work table in alternate directions whereby the bottoms of the bags in one group will be adjacent the open ends of the bags in the next adjacent group, yieldably biased abutment means operatively associated with said work table and positioned thereabove, means for pushing each said group of bags toward engagement with said abutment means, means for restraining said bag groups against retrograde movement, and means effective after a predetermined number of bag groups have been formed into a bundle on said work table to displace said abutment means out of the path of movement of the collected bundle and to discharge said bundle from said work table.

2. Bag transfer apparatus including a main frame, a conveyor mounted on said frame and comprising a pair of endless chains each provided with a plurality of outwardly extending lugs normally disposed in spaced parallel relation, a bag-receiving table portion interposed between the intake portion of said conveyor and the discharge station of an associated bagmaking machine for initially receiving individual vertically positioned bags therefrom, means operatively positioned beneath said receiving table portion for assembling said bags into successive groups each containing a predetermined number of bags and for moving each such group into engagement between pairs of lugs on said conveyor, said bag group assembling means including a pair of picker fingers alternately movable through an orbital path having a portion overlapping the path of travel of said lugs adjacent the intake end of said conveyor, a work table located adjacent the discharge end of said conveyor, and alternately operable means located on opposite sides of said conveyor adjacent the discharge end thereof for removing each successive bag group from the lugs of said conveyor and transferring it onto said work table, said transferring means being effective to deposit alternate bag groups edgewise onto said work table in alternate directions whereby the bottoms of the bags in one group will be adjacent the open ends of the bags in the next adjacent group.

3. Bag transfer apparatus including a main frame, a conveyor mounted on said frame and comprising a pair of endless chains each provided with a plurality of outwardly extending lugs normally disposed in spaced parallel relation, a bag-receiving table portion interposed between the intake portion of said conveyor and the discharge station of an associated bagmaking machine for initially receiving individual vertically positioned bags therefrom, means operatively positioned beneath said receiving table portion for assembling said bags into successive groups each containing a predetermined number of bags and for moving each such group into engagement between pairs of lugs on said conveyor, said bag group assembling means including a pair of picker fingers alternately movable through an orbital path having a portion overlapping the path of travel of said lugs adjacent the intake end of said conveyor, a work table located adjacent the discharge end of said conveyor, alternately operable grippers disposed on each side of said conveyor adjacent the discharge end thereof and movable through a compound generally helical path for removing successive bag groups from the lugs of said conveyor and transferring the same onto said work table from alternate directions whereby the bottoms of the bags in one group will be adjacent the open ends of the bags in the next adjacent group, and means operatively associated with said work table for assembling a predetermined number of said bag groups into successive bundles each containing a predetermined number of such groups.

4. Bag transfer apparatus including a main frame, a conveyor mounted on said frame and comprising a pair of endless chains each provided with a plurality of outwardly extending lugs normally disposed in spaced parallel relation, a bag-receiving table portion interposed between the intake portion of said conveyor and the discharge station of an associated bagmaking machine for initially receiving individual vertically positioned bags therefrom, means operatively positioned beneath said receiving table portion for assembling said bags into successive groups each containing a predetermined number of bags and for moving each such group into engagement between pairs of lugs on said conveyor, said bag group assembling means including a pair of picker fingers alternately movable through an orbital path having a portion overlapping the path of travel of said lugs adjacent the intake end of said conveyor, a work table located adjacent the discharge end of said conveyor, alternately operable grippers disposed on each side of said conveyor adjacent the discharge end thereof and movable through a compound generally helical path for removing successive bag groups from the lugs of said conveyor and transferring the same onto said work table from alternate directions whereby the bottoms of the bags in one group will be adjacent the open ends of the bags in the next adjacent group, means operatively associated with said work table for assembling a predetermined number of said bag groups into successive bundles each containing a predetermined number of such groups, and means for removing each such assembled bundle from said work table.

5. Bag transfer apparatus including a main frame, a conveyor mounted on said frame and comprising a pair of endless chains each provided with a plurality of outwardly extending lugs normally disposed in spaced parallel relation, a bag-receiving table portion interposed between the intake portion of said conveyor and the discharge station of an associated bagmaking machine for initially receiving individual vertically positioned bags therefrom, means operatively positioned beneath said receiving table portion for assembling said bags into successive groups each containing a predetermined number of bags and for moving each such group into engagement between pairs of lugs on said conveyor, said bag group assembling means including a pair of picker fingers alternately movable through an orbital path having a portion overlapping the path of travel of said lugs adjacent the intake end of said conveyor, a work table located adjacent the discharge end of said conveyor, alternately operable grippers disposed on each side of said conveyor adjacent the discharge end thereof and movable through a compound generally helical path for removing successive bag groups from the lugs of said conveyor and transferring the same onto said work table from alternate directions whereby the bottoms of the bags in one group will be adjacent the open ends of the bags in the next adjacent group, yieldably biased abutment means operatively associated with said work table and positioned thereabove, means for pushing each said bag group toward engagement with said abutment means, means for restraining said bag groups against retrograde movement, and means effective after a predetermined number of bag groups have been formed into a bundle to displace said abutment means out of the path of movement of the collected bundle and to discharge said bundle from said work table.

References Cited in the file of this patent
UNITED STATES PATENTS

| | | |
|---|---|---|
| 524,288 | Teal | Aug. 7, 1894 |
| 997,201 | Mascord | July 4, 1911 |
| 1,153,294 | Dunnebier et al. | Sept. 14, 1915 |
| 1,221,196 | Lewis | Apr. 3, 1917 |